(No Model.)

G. W. HOLAND.
VETERINARY INSTRUMENT.

No. 403,534. Patented May 21, 1889.

Witnesses.

Inventor,
George W. Holand
By his Attorneys

UNITED STATES PATENT OFFICE.

GEORGE W. HOLAND, OF SHELBYVILLE, ILLINOIS, ASSIGNOR TO WILLIAM W. THORNTON, OF SAME PLACE.

VETERINARY INSTRUMENT.

SPECIFICATION forming part of Letters Patent No. 403,534, dated May 21, 1889.

Application filed March 16, 1889. Serial No. 303,506. (No model.)

*To all whom it may concern:*

Be it known that I, GEORGE W. HOLAND, a citizen of the United States, residing at Shelbyville, in the county of Shelby and State of Illinois, have invented new and useful Improvements in Veterinary Instruments, of which the following is a specification.

The invention relates to improvements in veterinary instruments.

The object of the present invention is the production of a device of simple and inexpensive construction adapted to hold the mouth of a horse or other animal open to expose the throat and mouth when it is desired to operate upon them.

The invention consists in the construction and novel combination and arrangement of parts hereinafter fully described, illustrated in the accompanying drawings, and pointed out in the claim hereto appended.

Figure 1:
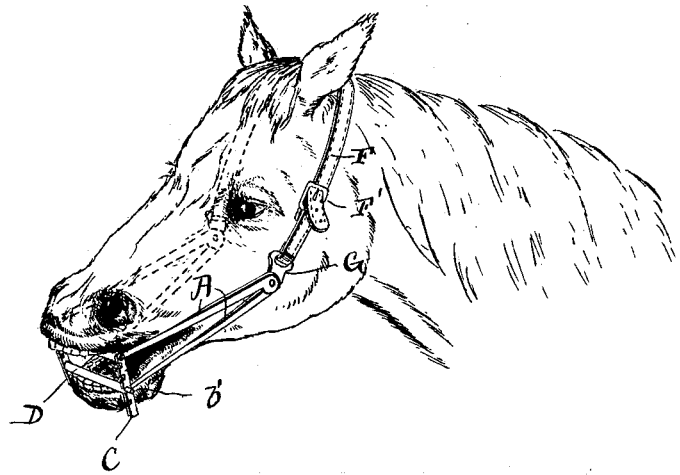
Figures 2, 3:
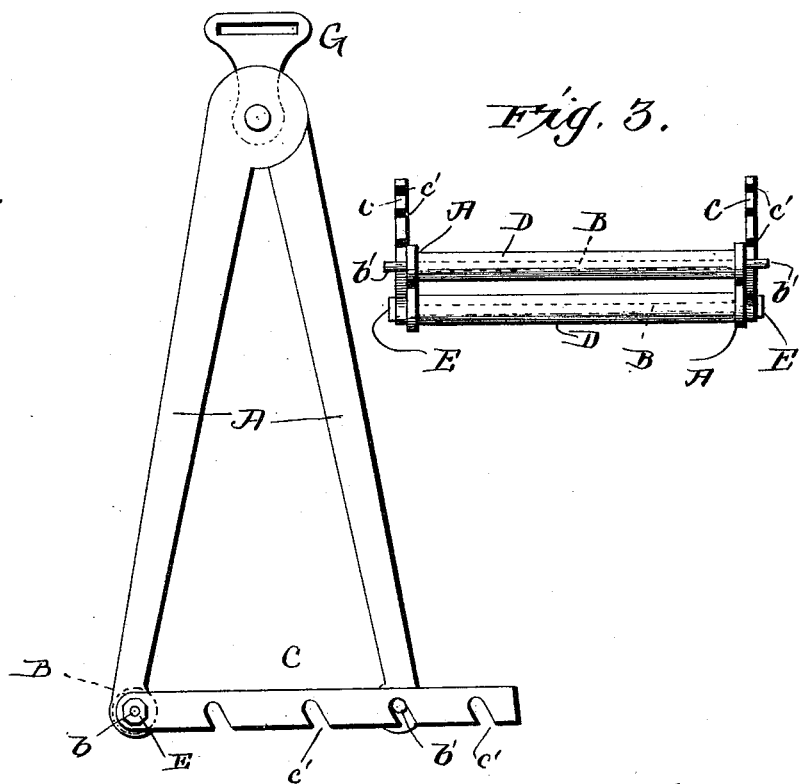

In the drawings, Figure 1 is a perspective view of a device embodying my invention. Fig. 2 is a side elevation of the same, the strap being removed. Fig. 3 is a front elevation.

Referring to the accompanying drawings, A designates similar side bars, which are constructed of suitable material, preferably metal, and hinged together at their inner ends in a manner similar to a pair of compasses, in order that the bars A will lie in the same vertical plane. A pair of these bars A, hinged or pivoted together, form the side of the device, and the free ends of said bars A are connected by two bit-rods, B, the ends $b$ of which are extended beyond the side bars, A, the upper extensions to form pivots for a notch-bar, C, and the lower ones to engage the notch $c'$ in said bar C to hold the side bars, A, separated and the animal's jaws apart.

In order to protect the animal's mouth from injury, the bit-rods B are covered with soft rubber sleeves D, and the said rods B are extended on both sides, the ends $b$ of the upper rod, B, being threaded and provided with nuts E, which retain the notched separating-bars to the side bars, A, and allow them to swing back and forth to bring the ends $b'$ of the lower bit-rod, B, into and out of engagement with the notches $c'$.

The device is attached to an animal's head by a strap, F, and buckle F', the former being attached to one pair of the side bars, A, by means of a loop-plate, G, which is secured to said bars A by the pivot which connects the bars A, and the latter being attached to the other pair of bars A in a similar manner and arranged to receive the strap F to adjust the device.

After the device has been secured to an animal's head, somewhat similarly to the manner of securing an ordinary bit, the bars are separated by the hands, and the ends $b'$ of the lower bit-rod, B, brought into engagement with one of the notches $c'$ of the bar C, which securely holds the bars A in that position.

From the foregoing description and the accompanying drawings the construction and operation of the device will readily be understood.

I am aware that it is not broadly new to hold the hinged bars apart by a notched bar.

Having thus described my invention, I claim—

The combination of the hinged side bars, the bit-rods connecting the free ends thereof, and the notched bars pivoted to one of the bit-rods and engaging the other, substantially as described.

In testimony that I claim the foregoing as my own I have hereto affixed my signature in presence of two witnesses.

GEORGE W. HOLAND.

Witnesses:
K. A. HITE,
J. E. KENSIL.